US010702948B2

(12) United States Patent
Ortner et al.

(10) Patent No.: US 10,702,948 B2
(45) Date of Patent: Jul. 7, 2020

(54) LASER PROCESSING OF A MULTI-PHASE TRANSPARENT MATERIAL, AND MULTI-PHASE COMPOSITE MATERIAL (71) Applicant: Schott AG, Mainz (DE)

(72) Inventors: Andreas Ortner, Gau-Algesheim (DE); Niklas Bisch, Lörzweiler (DE); Fabian Wagner, Mainz (DE); Albrecht Seidl, Niedernberg (DE); Frank-Thomas Lentes, Bingen (DE)

(73) Assignee: Schott AG, Mainz (DE)

( * ) Notice: Subject to any disclaimer, the term of this patent is extended or adjusted under 35 U.S.C. 154(b) by 46 days.

(21) Appl. No.: 15/858,705

(22) Filed: Dec. 29, 2017

(65) Prior Publication Data

US 2018/0117708 A1 May 3, 2018

Related U.S. Application Data (63) Continuation of application No. PCT/EP2016/060742, filed on Jun. 28, 2016.

(30) Foreign Application Priority Data

Jun. 29, 2015 (DE) .................. 10 2015 110 422

(51) Int. Cl.
*B23K 26/0622* (2014.01)
*C03C 23/00* (2006.01)
(Continued)

(52) U.S. Cl.
CPC ...... *B23K 26/0624* (2015.10); *B23K 26/0648* (2013.01); *B23K 26/352* (2015.10);
(Continued)

(58) Field of Classification Search
CPC B23K 26/0624; B23K 26/0648; B23K 26/53; B23K 26/352; B23K 2103/50;
(Continued)

(56) References Cited

U.S. PATENT DOCUMENTS 6,300,262 B1 * 10/2001 Beall ...................... C03B 32/02
501/5
8,141,387 B2 * 3/2012 Letz ....................... C03B 32/02
423/594.16
(Continued)

FOREIGN PATENT DOCUMENTS

DE   10 2012 110 971 A1   5/2014
DE      102012110971 A1 *  5/2014  .......... B28D 5/0011
(Continued)

OTHER PUBLICATIONS

[NPL-1] "RG610"; Volume Precision Glass, Inc., (Nov. 27, 2011) <http://www.vpglass.conn/filter_glass/schott_rg610_filter_glass.htnnl>. (Year: 2011).*
(Continued)

*Primary Examiner* — David Sample
*Assistant Examiner* — Donald M Flores, Jr.
(74) *Attorney, Agent, or Firm* — Taylor IP, P.C.

(57) ABSTRACT

A method provides for producing modifications in or on a transparent workpiece using a laser processing device. The laser processing device has a short pulse or ultrashort pulse laser that emits laser radiation having a wavelength in the transparency range of the workpiece and which has a beam-shaping optical unit for beam shaping for focusing the laser radiation. The transparent workpiece is composed of a material that has a plurality of phases, of which at least two phases have different dielectric constants, of which in turn the one phase is a phase embedded in the form of particles, which phase is substantially surrounded by the other phase, and wherein the product of the volume of the particles specified in cubic nanometers and the ratio of the absolute value of the difference of the two different dielectric constants to the dielectric constant of the surrounding phase is greater than 500.

18 Claims, 6 Drawing Sheets (51) Int. Cl.
| | |
|---|---|
| B23K 26/06 | (2014.01) |
| B32B 5/30 | (2006.01) |
| B32B 7/025 | (2019.01) |
| B32B 5/16 | (2006.01) |
| C03B 32/02 | (2006.01) |
| C03C 10/00 | (2006.01) |
| B23K 26/352 | (2014.01) |
| B23K 26/53 | (2014.01) |
| B23K 103/00 | (2006.01) |
| C03B 27/012 | (2006.01) |
| C03C 1/00 | (2006.01) |

(52) U.S. Cl.
CPC .............. B23K 26/53 (2015.10); B32B 5/16 (2013.01); B32B 5/30 (2013.01); B32B 7/025 (2019.01); C03B 32/02 (2013.01); C03C 10/00 (2013.01); C03C 23/0025 (2013.01); *B23K 2103/42* (2018.08); *B23K 2103/50* (2018.08); *B23K 2103/52* (2018.08); *B23K 2103/54* (2018.08); *C03B 27/012* (2013.01); *C03C 1/00* (2013.01); *C03C 10/0027* (2013.01); *Y10T 428/24942* (2015.01)

(58) Field of Classification Search
CPC ............ B23K 2103/54; B23K 2103/42; B23K 2103/52; C03C 10/00; C03C 23/0025; C03C 1/00; C03C 10/0027; C03B 32/02; C03B 27/012; B32B 5/16; B32B 7/025; B32B 5/30; Y10T 428/24942
See application file for complete search history.

(56) References Cited

U.S. PATENT DOCUMENTS

| | | |
|---|---|---|
| 9,249,045 B2 | 2/2016 | Gabel et al. |
| 9,296,066 B2 | 3/2016 | Hosseini et al. |
| 9,764,978 B2 | 9/2017 | Krueger et al. |
| 2003/0020149 A1 | 1/2003 | Ogura et al. |
| 2004/0104846 A1 | 6/2004 | Ogura et al. |
| 2005/0173387 A1 | 8/2005 | Fukuyo et al. |
| 2005/0202650 A1 | 9/2005 | Imori et al. |
| 2013/0126573 A1* | 5/2013 | Hosseini ............ B23K 26/0604 225/2 |
| 2013/0280449 A1 | 10/2013 | Riezman et al. |
| 2015/0038313 A1 | 2/2015 | Hosseini |
| 2015/0151380 A1 | 6/2015 | Hosseini |
| 2016/0031745 A1 | 2/2016 | Ortner et al. |

FOREIGN PATENT DOCUMENTS

| | | |
|---|---|---|
| JP | 2011-147943 A | 8/2011 |
| KR | 10-2014-0072448 A | 6/2014 |
| WO | 2012/006736 A2 | 1/2012 |
| WO | 2012/073153 A1 | 6/2012 |
| WO | 2014/111385 A1 | 7/2014 |

OTHER PUBLICATIONS

[NPL-2] "Definitions Glass Filters 2009"; Schott <http://glassfab.com/wp-content/uploads/2015/08/schott_filter_catalog.pdf>. (Year: 2009).*

[NPL-3] Haselhorst et al. (DE 10 2012 110 971 A1); (May 15, 2014); (EPO machine translation to English). (Year: 2014).*

Notice of Transmission of the International Research Report and the Written Notice Issued the International Searching Authority or Declaration dated Sep. 27, 2016 for International Patent Application No. PCT/EP2016/060742 (12 pages).

German Office Action dated Feb. 10, 2016 for German Application No. 10 2015 110 422.9 (10 pages).

"Femtosecond filamentation in transparent media", A. Couairon, A. Mysyrowicz, Physics Reports vol. 441, Issues 2-4, Mar. 2007, pp. 47-189 (143 pages).

"Femtosecond laser-induced color change and filamentation in Ag+-doped silicate glass", H. Sun et al., Chinese Optics Letters, vol. 7, Issue 4, pp. 329-331, 2009 (3 pages).

"On the Reversibility of Laser-induced Phase-structure Modification of Glass-ceramics", Journal of Laser Micro/Nanoengineering, vol. 1, No. 2, 2006 (6 pages).

"Structure and Properties of Glass Ceramics After Laser Treatment", Glass and Ceramics, vol. 56, Issue 5-6 (1999), 144-148 (5 pages).

Japanese Office Action dated Nov. 19, 2018 for parallel Japanese Application No. 2017-568094 (3 pages).

"Characterizations and Electrical Properties of ZrTiO4 Ceramic", Aneesh George, Sam Solomon, J.K. Thomas and Annamma John, Materials Research Bulletin 47, 2012, pp. 3141-3147 (8 pages).

* cited by examiner

LASER PROCESSING OF A MULTI-PHASE TRANSPARENT MATERIAL, AND MULTI-PHASE COMPOSITE MATERIAL

CROSS REFERENCE TO RELATED APPLICATIONS

This is a continuation of PCT application No. PCT/EP2016/060742, entitled "LASER PROCESSING OF A MULTI-PHASE TRANSPARENT MATERIAL, AND MULTI-PHASE COMPOSITE MATERIAL", filed Jun. 28, 2016, which is incorporated herein by reference.

BACKGROUND OF THE INVENTION

1. Field of the Invention

The invention relates to a method for efficiently producing modifications in or on a multi-phase transparent material, in particular using a short pulse or ultrashort pulse laser.

2. Description of the Related Art

A method for efficiently producing modifications in or on a multi-phase transparent material, can be used for efficient local modification of the workpiece or its material properties, and the composite material can as well be locally modified correspondingly in efficient manner. In particular, such a method can be used for efficiently producing a series of aligned linear modifications along a predetermined contour, and such linear modifications can as well be produced in the composite material in efficient manner. In this case, the method is suitable for separating the workpiece, and the composite material can as well be easily separated correspondingly.

Generally, there are many different possibilities for producing modifications in or on transparent materials using laser radiation.

JP002011147943A describes the suppression of thermal effects in the laser processing of substrates, for example. For this purpose, the end portion of a substrate is laser-processed by means of a Bessel beam.

For the special case of linear modifications, i.e. for the case of intentionally producing linear or filamentary defects, a number of techniques are already available as well.

"Femtosecond filamentation in transparent media", A. Couairon, A. Mysyrowicz, Physics Reports Vol. 441, Issues 2-4, March 2007, pages 47-189, describes the essential mechanisms in the formation of filamentation of ultrashort laser pulses in various transparent media.

It is also known from WO 2012/006736 A2 that by utilizing nonlinear optical properties of transparent materials (i.a. the electro-optical Kerr effect and multiphoton absorption) it is possible to produce modifications in the glass in form of permanent linear or filamentary defects or damages by injecting laser radiation of sufficient radiation intensity ($>10^{12}$ W/m$^2$). A juxtaposition of such linear damages in glass caused by temporally and spatially changing laser irradiation (e.g. along a contour on the surface of a workpiece) allows to produce spatially extended modifications in the workpiece. With a suitable position and formation, such modifications may even allow for the separation of transparent substrates.

The high linear radiation intensities required for this purpose can be generated by using different physical effects: one possibility is the formation of a "real" filament, a waveguide self-created by the laser radiation by Kerr effect and plasma defocusing with a diameter of about 1 µm and a certain length ("soliton"); the other possibility is the targeted deterministic generation of a linear or filamentary intensity distribution using a beam-shaping optical unit, in which case the diameter of the intensity distribution is even significantly reduced by the non-linear interaction with the laser radiation.

A filament is a laser beam of high intensity that is extremely self-narrowing and is propagating very long in comparison to the diameter of the filament and is formed by one or more short or ultrashort laser pulses of sufficient power due to non-linear interaction of the beam with the medium. Often, the resulting permanent linear modification, such as a change of the refractive index, or the permanent linear damage zone in the material is referred to as a "filament".

The related laser technology is also referred to as Ultra Short Pulse (USP) technology or ultrashort pulse laser technology. As a result of the local increase of the refractive index due to the Kerr effect, the laser beam undergoes self-focusing inside the glass, whereby the intensity increases continuously, which in turn can lead to an avalanche release of electrons until the electron density gets so high at a certain point that the resulting change of the local complex permittivity of the material leads to a decrease of the refractive index and to an increase in absorbance. In extreme cases, a plasma explosion occurs in which the glass may incur irreversible damage around the plasma formation site, caused by the absorbed laser energy. The decrease in refractive index leads to a defocusing of the residual radiation. After the defocusing of the residual beam, a new focusing may occur, which in turn ends in a collapse along with a release of conduction electrons. This is referred to as a refocussing cycle. Depending on the pulse power, this effect may be repeated several times, as long as sufficient energy is available.

The power of the filamentary propagating laser beam decreases along the filament. Thus, the first plasma spots will absorb the largest amount of energy and also produce the greatest damages. Due to the occurring energy dissipation, the refocussing cycles are only possible over limited distances.

Such an introduction of defects into glass and glass ceramics, referred to as filamentation, is also described in DE 10 2012 110 971 A1.

From WO 2014/111385 A1 it is known that such permanent linear modifications in transparent materials like glass caused by suitable injection of short and ultrashort pulsed laser radiation can also be produced by focusing the laser beam, by suitable beam-shaping, not on a (nearly) punctiform focus area but rather on a "focal line" of a certain length. In contrast to a real filament, in which the highly narrowed laser beam propagates along the filament line, loses power in the process and finally re-expands (with greatly reduced residual power), the irradiation along the line in the case of the formation of a focal line takes place continuously radially with an incidence angle of less than 90° in the direction of the optical axis. This can be accomplished as described in various embodiments of WO 2014/111385 A1, for example by lenses or lens systems in which the focal distance varies with the beam radius, or by using conically ground lenses (axicons) that form point sources to a line. Also in these cases, permanent modification or damage of the material may occur due to non-linear interaction with the medium, if the beam shaping is appropriate and the beam power is sufficient in the region of the focal line. A juxtaposition of such linear damages in glass generated by temporally and spatially changing laser irradiation (e.g., along a line on the surface of a workpiece) allows for spatially extended modifications in the workpiece also in this case. With an appropriate position and formation, such modifications can allow a separation of transparent substrates also in this case. Since a significant part of the laser radiation is supplied laterally/radially—and not nearly just in the direction of the optical axis in the filament being formed as in the case with real filamentation—it is possible to produce significantly longer damage lines in dielectric solids such as glass, without excessive attenuation of the laser beam.

KR 2014-0072448 (A) also discloses a device for cutting glass using an axicon as an optical unit, in which the glass is irradiated with a laser beam. A beam with a multiple focus is generated using a collimating lens within the laser beam and the aforementioned axicon. The glass is arranged within the focal range.

It is furthermore known that it is possible, by "simply" focusing suitable laser radiation of sufficient power onto or into a medium (i.e. without focusing the beam onto a focal line, without formation of a beam propagating in filamentary manner) to produce spatially localized modifications or damages in the medium by non-linear interaction with the medium. This is utilized for all forms of laser ablation in the processing of surfaces, and also for selectively introducing punctiform modifications inside a transparent material ("laser scribing"), and also for spot welding of two superimposed transparent workpieces, e.g. two sheets of glass. It is also possible to modify a plurality of such focal points successively, so that a series of adjacent modifications or damages is provided along a line, like a string of pearls. Such a method is described in US 2005/173387 A1, for example.

From "Femtosecond laser-induced color change and filamentation in $Ag^+$-doped silicate glass", H. Sun et al., Chinese Optics Letters, Vol. 7, Issue 4, pp. 329-331 (2009), it is furthermore known that color changes and multiple filamentation in glasses can be achieved by laser irradiation.

Structural changes in glass ceramics may as well be reversible. This effect is described in "On the Reversibility of Laser-induced Phase-structure Modification of Glass-ceramics", Journal of Laser Micro/Nanoengineering, Vol. 1, No. 2, 2006.

Glass ceramic is a material that includes an amorphous glass phase and at least one crystalline phase. The production process of glass ceramics starts with a so-called green glass that is subjected to a special temperature treatment, whereby a partial crystallization takes place, which is called ceramization and during which individual finely dispersed crystals are formed in the glassy material. This transformation process of the material can be subdivided into nucleation and the subsequent crystal growth at the crystallization nucleus. For nucleation, impurities are purposely added to the green glass, which precipitate when heated and are effective as crystallization seeds. For ceramization, both processes, i.e. the ideally uniformly dispersed and dense nucleation and the crystal growth must be coordinated. This can be controlled via temperature.

Structural changes of glass ceramics after laser irradiation are known from the article "Structure and properties of glass ceramics after laser treatment", Glass and Ceramics, Vol. 56, Issue 5-6 (1999), 144-148.

Essential properties of a glass ceramic are determined by the volume ratio of the amorphous phase to the crystalline phase, but also by the fact that the glass ceramic also includes the initial seeds, which differ in their composition from the growing crystalline phase. Strictly speaking, the glass ceramic therefore includes at least three phases. The different phases of the glass ceramic are characterized by a differing dielectric constant. This has an effect on the speed of light in the glass ceramic, since the speed of light in a medium depends on the value of the dielectric constant, inter alia.

It is also known that bubble inclusions in glass can cause plasma formation when a laser beam hits the glass-air interface. However, this is rather a disturbing phenomenon.

SUMMARY OF THE INVENTION

The present invention provides a generic method or a generic composite material so that material modifications of a sufficient size, strength, or damage are obtained. Therefore, one aspect of the present invention includes producing material modifications efficiently.

For example, linear material modifications of a sufficient length may be desired in order to facilitate subsequent separation (e.g. by applying a bending stress) of the workpiece along a line of adjacently introduced modification lines. In this exemplary case, these linear material modifications may be produced by a laser beam propagating in filamentary manner, but also by a laser beam focused onto a focal line, or else by a linear series of adjacent focal points.

The method provides modifications produced in or on a transparent workpiece by means of a laser processing device.

The laser processing device that is used includes a short pulse or ultrashort pulse laser which emits laser radiation having a wavelength in the transparency range of the workpiece and which has a beam-shaping optical unit for beam shaping, in particular for focusing the laser radiation.

In particular, a transparent workpiece is used which is composed of a material that has a plurality of phases, of which at least two phases have different dielectric constants, of which in turn one phase is a phase embedded in the form of particles that is surrounded or is at least substantially surrounded by the other phase, and wherein the product of the volume of the particles specified in cubic nanometers and the ratio of the absolute value of the difference of the two different dielectric constants to the dielectric constant of the surrounding phase is greater than 500, preferably greater than 1000, more preferably greater than 2000.

Surprisingly, the method according to the invention enables the modifications to achieve a greater extent in or on the transparent workpiece than on a workpiece made of the same material which however does not have a phase embedded in the form of particles.

In the method, a workpiece is used which is composed of a material that has a plurality of phases. At least two of these phases have different dielectric constants. One of the two phases is provided in the form of particles and is embedded or substantially surrounded by the other phase. Furthermore, the product of the volume of the regions of the embedded phase specified in cubic nanometers and of the ratio of the absolute value of the difference of the two different dielectric constants to the dielectric constant of the surrounding phase is greater than 500, preferably greater than 1000, more preferably greater than 2000.

This can also be expressed in the way that the product of the ratio of the two different dielectric constants reduced by the value of one and the volume of the particles specified in cubic nanometers is greater than five hundred, preferably greater than one thousand, more preferably greater than two thousand, wherein the ratio of the two different dielectric constants is greater than one.

The described relationship can also be expressed in the following formula: (particle volume/nm$^3$)·($|\Delta\varepsilon_r|/\varepsilon_r$)>x with x∈{500, 1000, 2000}, with ∈$_r$ being the dielectric constant of the one phase, preferably a glassy medium, or the residual glass phase, and $|\Delta\varepsilon_r|$ being the absolute value of the difference of the dielectric constants of the glassy medium and the embedded phase.

The mentioned volume of the particles does not refer to the total volume of all particles but to the volume of one of the particles; in particular an average is taken into consideration, for example an average of at least 50 percent of the particles, or else a median, as will be described below.

The material of the workpiece may in particular be a glass ceramic, but also a composite material. The embedded phase may in particular be a crystalline phase. The regions of the embedded phase that are substantially surrounded by another phase and which may in particular be crystals grown in glass ceramic are referred to as particles.

It has surprisingly been found that in particular glass ceramics react significantly differently to the impact of high-energy laser pulses than the green glass from which the glass ceramic is made.

In particular, it has been found that in such a multi-phase workpiece it is possible, with a certain laser power, to produce a damage or defect that has a significantly larger extent than in a single-phase workpiece made of the same material and with the same laser power. Therefore, the method according to the invention makes it possible to produce modifications of a larger extend in a multiphase workpiece compared to the processing of a single-phase workpiece, with the same laser power, or to produce modifications of a comparable size in a multiphase workpiece with a laser power that is reduced compared to the processing of a single-phase workpiece.

In a further embodiment of the invention, a series of adjacent linear material modifications are produced in a transparent workpiece along a line. For this purpose, the laser radiation as formed by means of the beam-shaping optical unit, preferably focused, is displaced relative to the workpiece in order to produce linear modifications in the workpiece along the direction of displacement. Each linear modification is produced by at least one laser pulse. It is also possible to apply a plurality of pulses in time succession at one location, or successive laser pulses can be emitted in the form of bursts.

In case of filamentation of the material, the linear material modifications may each constitute a channel of defects of usually at least 500 micrometer length, which is typically about 1 micrometer in diameter.

The path or the line along which the adjacent linear modifications are aligned may have a rectilinear or curved shape and/or may be angled or have corners.

Apart from producing linear modifications, the method according to the invention can also be used to produce modifications on the surface of the transparent workpiece. For this purpose, material is removed from the surface by means of the laser radiation. This includes the laser ablation process, for example. In this case, the method according to the invention permits to achieve a deeper and/or more extensive material removal on the surface.

The method according to the invention can in particular also be used to produce modifications inside the transparent workpiece. For this purpose, the parameters of the short pulse or ultrashort pulse laser can be adjusted so that damages to the surface of the transparent workpiece are avoided.

In other words, the method according to the invention can therefore also be used to generate inner markings or inner damages in the transparent workpiece. With suitable parameters to exclude damages to a surface through which the laser beam enters the workpiece. In particular it is possible to produce cavities, so-called voids, inside the material. The method according to the invention in particular allows to achieve more pronounced inner markings and larger voids.

A composite material that can be produced by the method according to the invention, in particular in the form of a glass ceramic, or else a polymer material, is distinguished by the fact that the product of the volume, specified in cubic nanometers, of a region of the at least one second phase and the ratio of the dielectric constants of the first phase and the at least one second phase reduced by the value of one is greater than five hundred, preferably greater than one thousand, more preferably greater than two thousand, wherein the dielectric constant of the first phase Ea is greater than or equal to the dielectric constant of the at least one second phase ∈$_{r2}$.

The product IE=(particle volume/nm$^3$)·($|\Delta\varepsilon_r|/\varepsilon_r$) with IE>500, preferably IE>1000, more preferably IE>2000 is a characteristic parameter for the interfacial effect (IE) described below. In the case of the composite material according to the invention, the average weighted by the volume fractions of the corresponding products is used as the product IE. As a physical cause it can be assumed that the normal component of the electric field intensity E exhibits a jump discontinuity at an interface of a material. The field strengths $E_1$, $E_2$ behave inversely proportional to the ratio of the dielectric constants. Thus, $E_2/E_1=\varepsilon_{r1}/\varepsilon_{r2}$ is valid. Therefore, the field strength will double with the transition from a dielectric material with $\varepsilon_{r1}=4$ into one with $\varepsilon_{r2}=2$.

According to the invention, at least one linear material modification extends inside the composite material, which material modification constitutes a channel of defects of at least 500 micrometers in length.

These linear modifications can extend over the entire thickness of the workpiece, in particular, if the laser processing device is aligned perpendicular to a surface of the workpiece at the location of the modification to be produced. Each linear modification represents a channel of defects substantially in the direction of the optical axis. It is contemplated to produce such modifications adjacently or successively along a line. In a subsequent process, the workpiece can then be separated along this line which may as well be a curve of any shape. The line can therefore serve as a separation line.

The series of linear modifications aligned along a predetermined contour which corresponds to the desired separation line or later fracture line is achieved by a relative movement of the suitably shaped, preferably focused, pulsed laser radiation with respect to the workpiece.

To produce a modification, in particular linear modifications as part of an entire separation line, the laser pulse may as well be emitted in the form of a burst. "Burst" means that the actual laser pulse is split into several partial pulses constituting a pulse packet. In this case, the short pulse or ultrashort pulse laser is thus applied in the so-called burst mode. The burst frequency which describes the time interval of the partial pulses of a burst is usually much greater than the repetition rate of the pulsed laser and can be 50 MHz, for example, compared to a repetition rate of only 1 kHz, for example. For this reason, all laser partial pulses of a burst are injected into the workpiece at almost the same location and all contribute to the formation of a single modification, preferably a linear modification.

Other important parameters of the short pulse or ultrashort pulse laser are its wavelength, which is in the transparency range of the workpiece, its average power, its repetition rate, its pulse duration and its beam profile.

The task of the beam-shaping optical unit is to generate an axially and transversely defined intensity distribution in the dielectric workpiece of a specific thickness.

Preferably, beam shaping systems are used which generate, instead of a perfect punctiform focusing, an intensity distribution that is extended in axial direction and compact in transversal direction in the workpiece.

For this purpose, the beam-shaping optical unit of the laser processing device may comprise optical elements of different shapes. For example, concave, convex, plano-concave, plano-convex lenses or even concave, convex, plano-concave, plano-convex lenses or axicons are possible. With axicons, it is in particular possible to generate or approximate laser beams whose intensity distribution corresponds to a Bessel beam from laser beams whose intensity distribution corresponds to a Gaussian beam. The method according to the invention also permits material processing by means of (approximated) Bessel beams. Alternatively, and preferred because of usually less adjustment need, it is possible to use optical systems with selective spherical aberration. In the simplest case, this may be spherical lenses or systems thereof or optical elements with aspheric faces. Furthermore, diffractive holographic elements with constant or variable properties can also be used. The aim is always to produce a uniform highest possible intensity along the optical axis over a distance ranging from several 100 μm up to several millimeters, with a lowest possible variation of the central full width at half maximum in the axial direction and a width of a few laser wavelengths.

Moreover, it is usually advantageous to adjust or control the x,y,z position as a function of time on the workpiece. Furthermore, in the case of deviations of the surface of the workpiece from a flat surface or in the case of curved surfaces such as tubes it may be advantageous to adjust or control the direction of the incident laser radiation with respect to the local surface normal.

On the other hand, it is also possible to choose the volume of the individual particles in dependence of the ratio of the dielectric constants of the embedded phase and the surrounding phase and of the desired length of the filaments.

For a given ratio of dielectric constants, the parameter of the volume size of the individual particles of the embedded phase may be a decisive quantity for obtaining a desired length or a desired form of the linear modifications in the workpiece.

A particularly easy adjustment of the length of the modifications is possible via the level of the pulse energy.

For example, in case of workpieces made of a multiphase material and by taking into account the known values of the different dielectric constants of the two or more phases, it is possible with the method according to the invention to obtain a desired extent or form of the modification, in particular of the length of a linear modification, by adjusting or varying the volume size of the individual particles of an embedded phase. Such an adjustment or variation is made by appropriate selection of the multiphase material.

In one embodiment of the method according to the invention, an optical element is used for deflecting the laser light and for successively modifying the point of incidence of the laser beam on the workpiece. The optical element may comprise at least one rotating mirror configured as a galvanometer scanner, for example.

Preferably, in case it is desired to produce a linear modification, the relative movement between the focused laser radiation and the workpiece is achieved by providing a workpiece table and a displacement device for aligning the focusing or beam-shaping optical unit to the workpiece for producing the linear modification in the workpiece and thereafter for an incremental relative displacement between the optical unit and the workpiece table according to the alignment line. However, a workpiece table may as well be provided for producing other types of modification.

Experiments in conjunction with the invention have surprisingly shown that glass ceramics react significantly different to the described process than the green glass corresponding to the respective glass ceramic. This difference is particularly evident in the distinctness, extent, or size of the resulting modification, which have been found to be significantly more pronounced, more extended or larger in the glass ceramic than in the green glass. In case of linear modifications, in particular the length of the resulting linear modifications is increased. It has been found that this is due to the multiphase nature of the glass ceramic with its composition varying on a submicron scale in the form of an embedded phase, typically in the form of nanoparticles in a glassy matrix.

In particular, the phases of the glass ceramic can include the seeds, a high-quartz solid solution, and a substantially surrounding amorphous residual glass phase. These phases have different dielectric constants. Thus, the glass ceramic includes interfaces where the dielectric constant exhibits a jump discontinuity. As described above, the interaction of high intensity laser radiation with the matter can lead to local plasma formation and thus to the formation of the described defects. Decisive for the type and strength of the interaction or for the modification of the material associated therewith is the amplitude of the electric field strength of the laser radiation, which is proportional to the root of the intensity. If a laser pulse propagates through a glass ceramic, the electromagnetic field (the wave) will have an effect on the glass ceramic.

In accordance with the continuity conditions of the electromagnetic field theory, a superelevation in field strength will occur at the interfaces of the phases, due to the different dielectric constants. The magnitude of the superelevation depends on the ratio of the two dielectric constants. Thus, the superelevation in field strength at the interfaces of the phases can be referred to as an "amplification factor". Therefore, it is desirable to have phases with the most possible different dielectric constants in order to provide for facilitated plasma formation with a high amplification factor.

It has surprisingly been found in experiments that not only the difference between the dielectric constants is decisive for an efficient material modification, but also the size of the individual phases. The interaction of particle size and amplification factor has turned out to be crucial in this case.

In addition to the above-mentioned three-phase glass ceramics, two-phase, four-phase, and other multiphase glass ceramics and multiphase materials of other material classes are also eligible for the method according to the invention. In particular, the material can be a composite material, such as a polymer material with finely dispersed particles, for example. Glass ceramics can be optical filters, known as filter glass, and glass ceramics with zero thermal expansion.

It may be contemplated that the predetermination of the size of the particle volume is based on the assumption that the extent of the effect of the interface between two phases for the formation of a plasma—referred to herein as "interfacial effect"—is proportional to the particle volume. The predetermination of the particle volume size may furthermore be based on the assumption that the particles have a ball-like, i.e. substantially spherical shape. In other words, it can be assumed with this assumption that the interfacial effect is proportional to the third power of the particle diameter.

Furthermore, for the predetermination of the particle size it can be assumed that the interfacial effect is proportional to the ratio of the dielectric constants of the two phases minus one (see above). In the ratio of the dielectric constants, the greater dielectric constant, for example that of the surrounding residual glass phase, is in the numerator, and the smaller dielectric constant, for example that of the high-quartz solid solution, is in the denominator. Plasma formation will always occur when the electromagnetic wave enters the medium with the smaller dielectric constant.

On basis of the three assumptions mentioned above, the following relation can preferably be used as a characteristic parameter IE for the interfacial effect: (particle volume/nm$^3$) $\cdot(|\Delta\varepsilon_r|/\varepsilon_r)$>x with x$\in$\{500, 1000, 2000\}, with $\varepsilon_r$ being the dielectric constant of the glassy medium.

In the above relationship, the first factor is a measure of the particle volume and the second factor is a measure of the jump in electric field strength. In case of equal dielectric constants, this factor and thus also the interfacial effect is zero. The particle diameter is specified in nanometers (nm), and the division by nm3 is only used for nondimensionalizing the parameter IE.

Due to the interfacial effect IE, damage, i.e., the formation of modifications, will already occur at rather low intensities in glass ceramics. Such modifications can then even be of a higher degree, more extended, more pronounced, larger or longer than in green glass. However, since not so much energy can be deposited per area, the defects are less pronounced in glass ceramics. By contrast, in a green glass corresponding to the glass ceramic, higher intensities are required, so that the damage will be greater there than in glass ceramics.

It has further been found that in the case of filamentary beam propagation, there will usually be a higher number of refocusing cycles in green glass. This can be explained by the interfacial effect described above. Since green glass requires higher intensities of the laser to ignite the plasma, the equilibrium state which determines the length of the filament is not so stable and collapses more rapidly. However, if the pulse has still sufficient energy afterwards, it can refocus.

It may further be contemplated to adjust the desired size or extent of the modifications, in particular the length in case of linear modifications, by adjusting the number of partial pulses per burst, if the burst mode is used. Depending on the configuration of the laser, the partial pulses of a burst may carry, in total, slightly more energy than a corresponding single pulse in single-shot mode. However, the smaller the number of pulses per burst, the higher is typically the energy of the first pulse of a burst. The higher the energy of the first pulse of the burst, the greater is the potential extent of the modifications. With the number of further pulses, only the so-called defect category increases. Defect category is a measure of the degree of damage to the transparent material (the extent of the modification). The following defect categories can be distinguished: 0=no modifications can be identified under 100 times of magnification; 1=thin channel; 2=thin channel with locally thicker areas; 3=extended damage; 4=cracks, micro-explosions, and/or melting range.

In comparison to glass ceramic, green glass requires an higher pulse energy in the first partial pulse, if the burst mode is used, in order to obtain the same size or extent of a modification, in particular the same length of a linear modification. By changing the number of partial pulses per burst, the energy of the first pulse can be modified, whereby it is possible to adjust the size or extent of the modification.

It may further be provided that the median of particle sizes is 6 nm or more, preferably 8 nm or more, more preferably 10 nm or more. It seems to exist a critical particle size above which the interfacial effect is particularly effective. Taking into account this critical particle size, the aforementioned median of the particle size may be advantageous.

Preferably, finely dispersed additional particles may be provided in the production of the workpiece material in order to make the process of producing the modification more efficient.

With the method according to the invention, which can in particular be applied to glass ceramics produced from sheet glass, it is possible to achieve better cutting performance with lower laser power than in the case of homogeneous glasses, which is associated with a financial advantage. The upper limit of the material thickness that can be processed, which is given due to the configuration-related limitation of the pulse energy of laser sources, is higher for multiphase materials than for homogeneous glasses, which is advantageous for an application on very thick or multi-layered materials.

In the composite material according to the invention, the regions of the first phase preferably surround the regions of the at least one second phase at least partially, i.e. substantially. Particularly preferably, the regions of the at least one second phase are completely embedded by the first phase in the composite material of the invention.

In the composite material according to the invention, regions of the at least one second phase can be spaced apart from one another. One embodiment of the composite material according to the invention is distinguished by the fact that the regions of the at least one second phase are substantially spherical. In another embodiment of the composite material according to the invention, the lengths of the linear modifications range between 100 and 10,000 μm, preferably between 1000 and 10,000, more preferably between 3000 and 10,000 μm.

Also, the ratio of the first and second dielectric constants $(\varepsilon_{r1}/\varepsilon_{r2})$ may be greater than or equal to 1.05, better greater than 1.1, preferably at least 1.3. In other words, this means that $|\varepsilon_{r1}-\varepsilon_{r2}|/\varepsilon_{r2}$, elsewhere also referred to as $|\Delta\varepsilon_r|/\varepsilon_r$, can be greater than or equal to 0.05, better greater than 0.1, preferably at least 0.3.

It will be understood that the composite material according to the invention can be composed of more than two phases. A plurality of second phases of different dielectric constants can be embedded in a first phase.

The composite material according to the invention preferably includes an aligned arrangement of linear modifications so as to form a separation line.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrates embodiments of the invention and such exemplifications are not to be construed as limiting the scope of the invention in any manner.

DETAILED DESCRIPTION OF THE INVENTION

Figure 1:
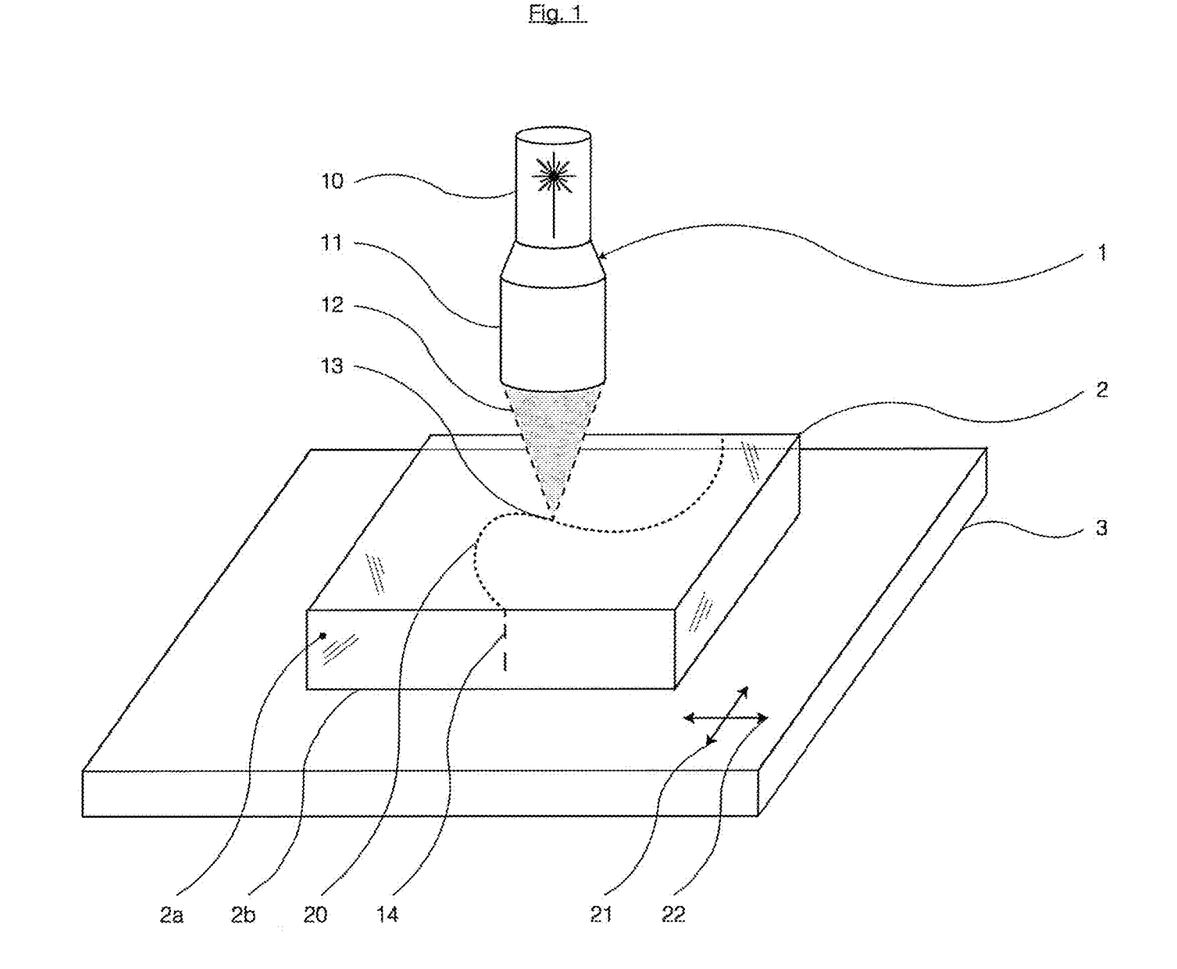
FIG. 1 shows a laser processing device while processing a workpiece on a workpiece table.

FIG. 1 illustrates a laser processing device 1 above a workpiece 2 which is supported on a workpiece table 3. Laser processing device 1 comprises an ultrashort pulse laser 10 and a focusing optical unit 11 in order to emit a focused beam of rays 12 with a focus 13 that is located approximately on the upper face of workpiece 2. On workpiece 2, a cutting line or fracture line 20 is indicated, along which the workpiece 2 will be separated or divided. Provision is made for displacing the focus 13 along this line 20, which can be accomplished by adjusting the table 3 in the two coordinate directions 21, 22. Very small adjustment increments are used.

The wavelength of the radiation of ultrashort pulse laser 10 is selected so that it is in a transparency range of workpiece 2. Ultrashort pulse laser 10 is operated in a so-called burst mode in which the actual pulse itself, referred to as a burst, is defined by a packet of pulses recurring at a repetition rate R of approximately 100 kHz. The energy of the laser pulses or of the pulse packets (bursts) is dimensioned so that with each burst a damage channel 14, referred to as a filament, is formed perpendicular to an upper face 2a of workpiece 2 in the interior thereof. By displacing the beam-shaping optical unit 11 along a predefinable displacement line 20, a series of linear modifications 14 is generated in the workpiece 2. With an advancement rate of 1 m/s, the starting points of damage channels 14 which are directed towards the bottom face 2b, will have a spacing of 10 μm on the upper face 2a along displacement line 20 of the ultrashort pulse laser 10. The displacement line 20 of ultrashort pulse laser 10 relative to workpiece 2 defines a fracture face and is therefore referred to as a fracture line 20.

Figure 2:
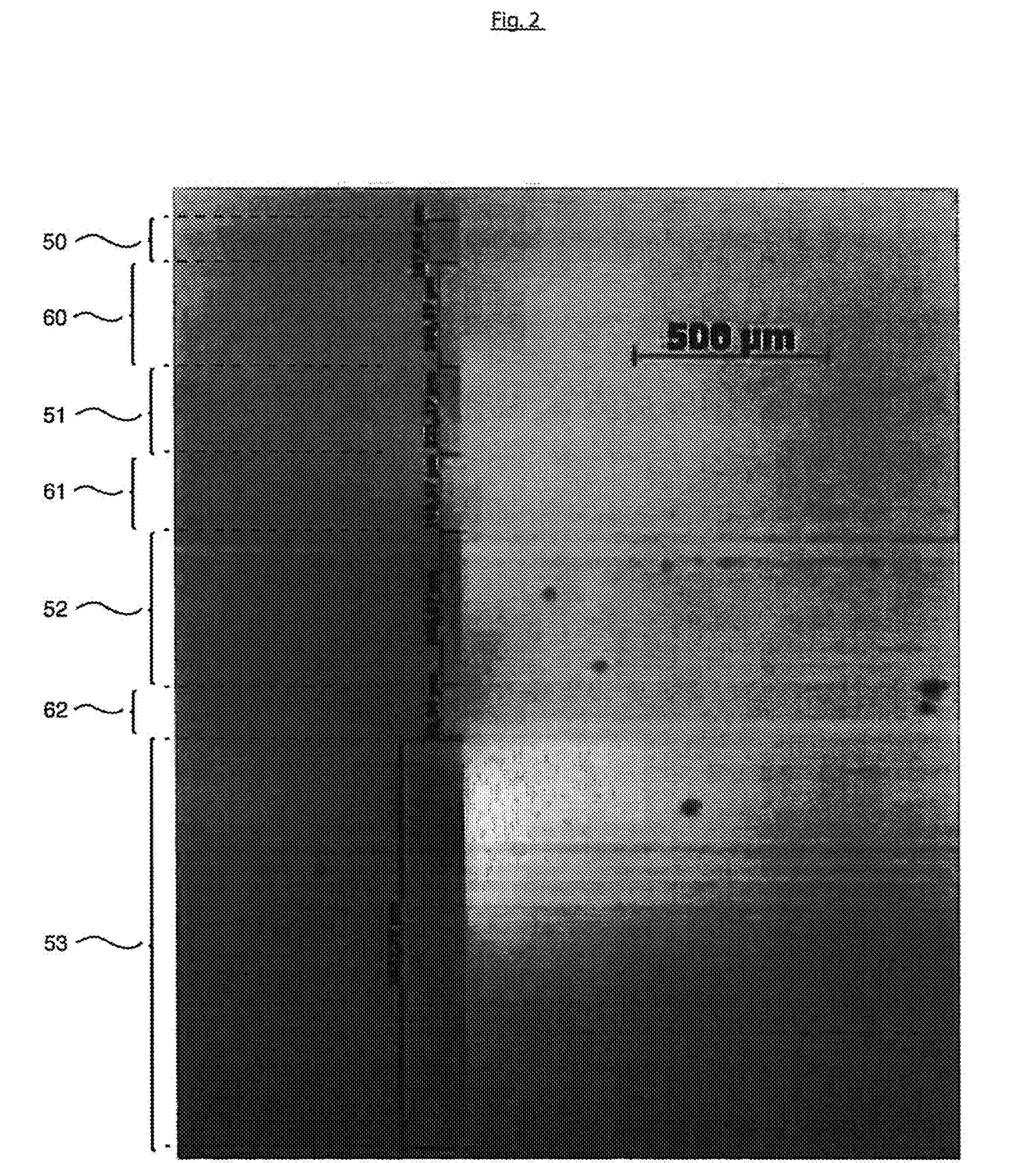
FIG. 2 shows a linear modification formed by defects in a glass ceramic.

Such linear modifications 14 produced by the method of the invention and in the composite material of the invention are shown in FIG. 2. As can be seen in FIG. 2, the linear modifications 14 are formed by defects 50, 51, 52, and 53 with lengths of 108 μm, 221 μm, 357 μm, and 1037 μm, which have been produced or which are arranged along a damage channel. The defects shown in FIG. 2 have a spacing 60, 61, and 62 of 263 μm, 195 μm, and 34 μm, respectively. Mean values from three measurements equivalent to FIG. 2 yielded defect lengths of 104 μm, 237 μm, 350 μm, and 1020 μm with a spacing of 290 μm, 209 μm, and 150 μm.

This exemplary embodiment, which is limited to the generation of linear modifications, shows that the defect lengths do not have to be consistent. Later, this can be of great advantage in order to be able to properly divide the workpiece along the alignment line of the filaments.

Accordingly, in a further embodiment of the method of the invention it is generally contemplated, without being limited to the specific exemplary embodiment explained above, that linear modifications 14 which are aligned along a line 20 in a transparent workpiece 2, are each formed of a plurality of defects that are arranged along a channel, and that the lengths the defects increase with increasing distance from a surface of the workpiece. Thus, in case of a tensile or bending load, as it is applied to the alignment line of the linear modifications for intentionally breaking the workpiece, there will be shorter defects near the surface, that is where the greater bending stress occurs. In the volume, towards the center of the workpiece, the tensile stress will be smaller in the case of a bending load. However, the defects are longer and the workpiece is weakened here to a greater extent. Thus, when the workpiece is subjected to a bending load, the critical bending stress is distributed more evenly along the filament structure, so that the fracture behavior is improved.

In the following, the investigation of a corresponding pair of glass ceramic and green glass will be described, which are referred to as glass ceramic A and green glass A. Green glass A has a glass composition that contains $Li_2O$ (lithium oxide), $Al_2O_3$ (aluminum oxide), $SiO_2$ (silicon dioxide) and a total of about four weight percent of $TiO_2$ (titanium dioxide) and $ZrO_2$ (zirconium dioxide). The transformation temperature of this composition is 670° C.

On basis of this green glass A, the glass ceramic A has been produced by ceramization, during which finely dispersed individual crystals are being formed in the glassy material. For this purpose, the green glass A was processed in an electrically heated ceramization furnace. The resulting transformation process of the material can be subdivided into nucleation and crystal growth. At the beginning of each crystallization is a crystallization seed at which the crystal can begin to grow.

Green glass A contains impurities in the form of the added titanium dioxide and zirconium dioxide, which have a high melting temperature (1855° C. and 2715° C., respectively), and precipitate when heated so as to be effective as crystallization seeds. They represent heterogeneous seeds during the ceramization process, whereby a high seed density and a small crystal size is achieved. Due to crystal growth, a high-quartz solid solution ($HQ_{ss}$) grows on the crystallization seeds of orthorhombically arranged $ZrTiO_4$. It is based on the LAS system which takes its name from the crystal building blocks of lithium oxide, aluminum oxide, and silicon dioxide. Quartz ($SiO_2$) transforms into so-called high-quartz at 573° C. However, due to the incorporation of other atoms, the $HQ_{ss}$ is stable when this temperature is undershot.

An ultrashort pulse laser was employed for the investigations, using a wavelength of 1064 nm, an average power of 12 W (at 1064 nm, 100 kHz, 1 pulse per burst), a repetition rate of 100 kHz, a burst frequency of 50 MHz, a pulse duration of about 10 ps (at 1064 nm and 100 kHz), and a Gaussian beam as the beam profile.

The energy that is introduced and absorbed by a laser pulse leads to a stronger heating in the glass ceramic A, due to the lower heat capacity compared to green glass, and the developed heat is also dissipated more efficiently than in the green glass A. However, in very short time regimes in the nanosecond range, no significant heat dissipation is to be expected, wherefore the assumption of a higher temperature in glass ceramic A compared to green glass A is justified.

In the burst mode, the second pulse of the burst will therefore impinge at an already preheated area. The burst frequency of 50 MHz results in an interval of only 20 ns between the individual pulses, which satisfies the condition mentioned in the previous paragraph. Although the effects of the burst mode in the USP laser blast technology have not yet been definitively clarified, yet there is a stronger presumption on the heat deposition which influences the behavior of the further pulses. The produced defects are formed more efficiently with increasing number a of pulses.

Therefore, a series of tests was carried out, in which linear modifications were introduced and both materials were each processed with different numbers of pulses a per burst, according to a preferred embodiment of the invention. Four lenses of different focal lengths were used, in order to obtain a broader variety of data. According to the theory outlined above, the ratio of the total lengths of the defects or linear modifications in glass ceramic A to the corresponding total length in green glass A should increase with an increasing number of pulses per burst, since the effect of heat deposition becomes more significant with increasing number of partial pulses.

However, the energy distribution to the individual partial pulses of the burst must be taken into account. With only one partial pulse, the pulse energy is 120 μJ and the peak pulse power is 12 MW. In case of the two-pulse burst mode, on the other hand, the first pulse has about 77 μJ and the second 56 μJ. Therefore, if the number of pulses is high, the pulse energies and thus also the pulse peak powers and intensities may be too low to cause a modification in the material.

Figure 3:
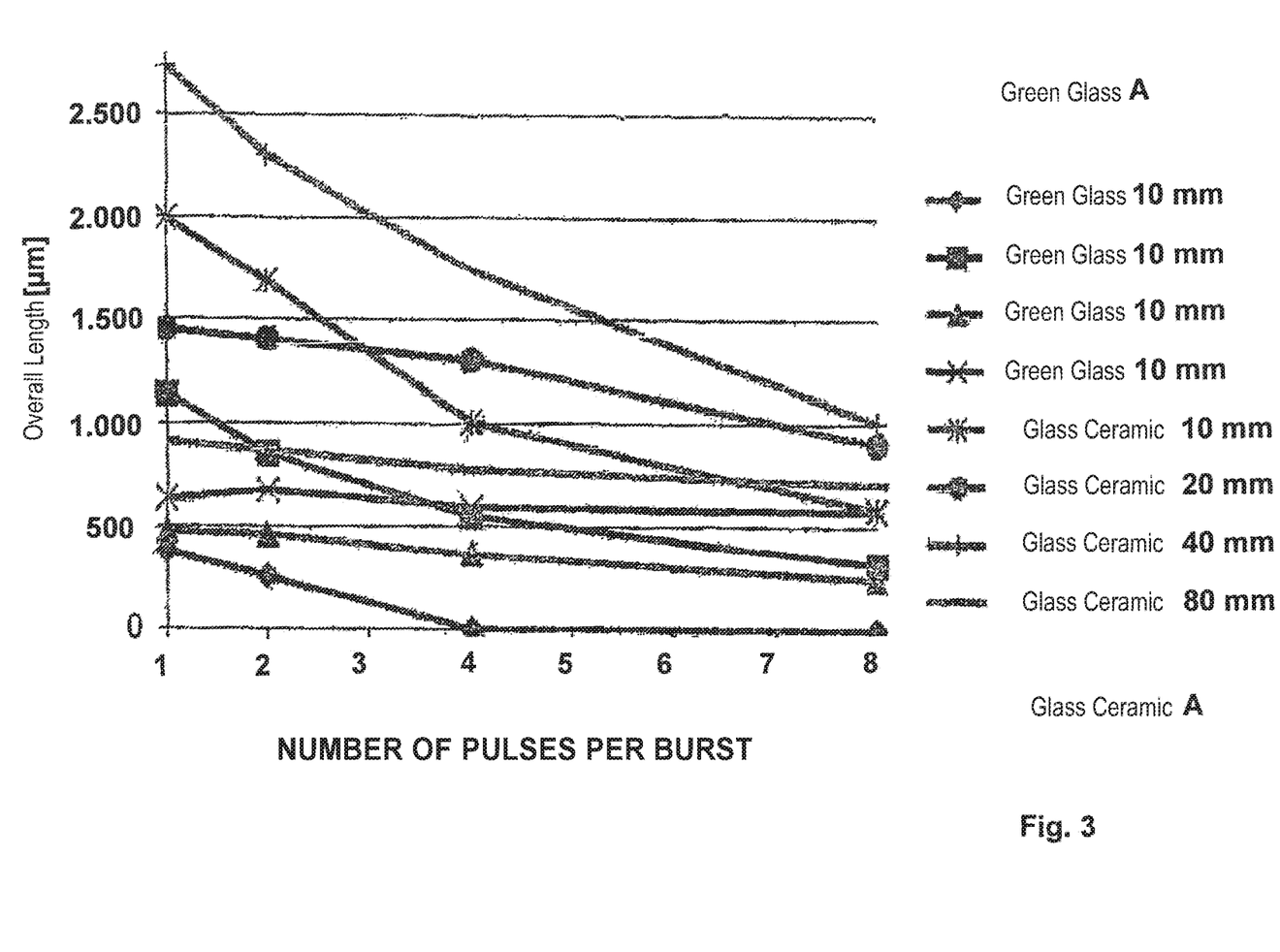
FIG. 3 shows lengths of linear modifications which have been produced in glass ceramic and in the corresponding green glass, for comparison reasons, using lenses of different focal lengths of the focusing optical unit, as a function of the number of pulses per burst.

The repetition rate, the advancement rate in y-direction (1 m/s), and the power level (100%) were kept constant during the test series. FIG. 3 shows the results.

No damage to the material occurred only with two constellations: green glass A, 10 mm focal length, and four or eight pulses per burst, respectively. Here, the pulse energy of the first partial pulse of the burst was not sufficient to produce a modification of the material. For other optics, this absence was not observed, since the beam shape generated by such other optics is probably more suitably.

The results show a strong dependence of the total length on the number a of partial pulses. With one exception (green glass A, focal length equal to 80 mm, and a equal to two), the total length decreases with increasing number of partial pulses, as shown in FIG. 3, in which the measurement points were connected in order to illustrate the monotonically decreasing characteristic of the measured data. This is presumably due to the low pulse energy of the first pulse of the available laser, which decreases for increasing partial pulse numbers a. The assumption that the energy of the first pulse is responsible for the length and the further partial pulses only amplify the type of damage has thus been confirmed at least in the first point.

In the following, the investigation of a material that is used for producing optical filters will furthermore be described. This is the material RG610, and this material was investigated as green glass (referred to as green glass RG610 below), and also as so-called filter glass produced by thermal treatment of the green glass and including at least 2 different glassy or glassy-crystalline phases.

In the state of the filter glass that exhibits two phases, the refractive index is 1.52. The yellowish green glass RG610 changes color by the heat treatment, whereby the filter glass RG610 appears deep red later. The reason for this are the resulting mixed phases (amorphous or crystalline) which contain cadmium, sulfur, selenium, and zinc. Since there is no refractive index available for these mixed phases, it was derived from the refractive indices at the D-line of 588 nm of similar crystals: zinc selenide, zinc sulfide, cadmium selenide, cadmium sulfide. Thus, a refractive index of the crystal of 2.53 is resulting. Since the crystalline phase only accounts for a small volume fraction (about 12%), the refractive index of the residual glass phase can be approximated by that of the green glass RG610 of 1.52. This results in a ratio of the dielectric constants (ratio of the squared refractive indices) of 2.770. The size of the crystals (diameter) is about 12 nm.

By applying the ultrashort pulse laser technology to RG610, the discrepancy between green glass and glass ceramic could be clearly demonstrated: The defects in the glass ceramic RG610 are more than twice as long as with the green glass RG610 and reach a length of up to 5 mm in glass of 6.6 mm thickness.

TABLE 1

| Material | Particle diameter/nm | Ratio of dielectric constants | Interfacial effect IE |
|---|---|---|---|
| Filter glass RG610 | 12 | 2.770 | 3059 |
| Glass ceramic A | 40 | 1.107 | 6848 |
| Pre-seeded material A | 4 | 2.374 | 88 |

Table 1 shows the factors of the interfacial effect IE for RG610 (as filter glass), and glass ceramic A (residual glass-phase and high-quartz solid solution interface), and pre-seeded material A (residual glass-phase and seed interface), which were calculated using the above stated formula.

Although the calculated value for glass ceramic A is more than twice as large as the value for the filter glass RG610 A, both values are of the same order of magnitude. This is different for the value of the pre-seeded material A.

The green glass and the glass ceramic A is a lithium aluminosilicate glass of the composition:
60-73.0 wt % of $SiO_2$;
15-25.0 wt % of $Al_2O_3$;
2.2-5.0 wt % of $Li_2O$;
0-5.0 wt % of CaO+SrO+BaO;
0-5.0 wt % of $TiO_2$;
0-5.0 wt % of $ZrO_2$;
0-4.0 wt % of ZnO;
0-3.0 wt % of $Sb_2O_3$;
0-3.0 wt % of MgO;
0-3.0 wt % of $SnO_2$;
0-9.0 wt % of $P_2O_5$;
0-1.5 wt % of $As_2O_3$;
0-1.2 wt % of $Na_2O+K_2O$, with respective amounts within the following specified ranges:
0-1.0 wt % of $Na_2O$;
0-0.5 wt % of $K_2O$; and
0-1.0 wt % of coloring oxides.

For two lenses it has been shown above that with a parameter adjustment it is possible to achieve the same filament structure length in glass ceramic A as in green glass A. In this case, it is also possible to achieve the same defect category as in green glass A. Accordingly, the energy of the first partial pulse of the burst is decisive for the defect length, whereas it has been found that the further pulses only increase the defect category. With the same parameters, the defects in glass ceramic A will in fact be longer than in green glass A, but with a lower defect category. With an increased number of partial pulses per burst, the defects become shorter and the defect category becomes higher. It was found that with eight partial pulses, the same results can be achieved in glass ceramic A as with two partial pulses in green glass A.

Due to the interfacial effect IE in glass ceramic A, damage is already caused at lower intensities, so that the defects are longer than in green glass A. However, since not so much energy can be deposited per area, the defects are not so pronounced. Green glass A, on the other hand, requires higher intensities, so that the damage is more pronounced here. This can be compensated with an increase in the number of partial pulses per burst, as mentioned above.

The usually higher number of refocusing cycles for green glass can also be explained with this model. Since higher intensities of the laser are necessary in case of green glass to ignite the plasma, the state of equilibrium which determines the defect length is more unstable and collapses more rapidly. However, if the pulse has still sufficient energy afterwards, it can refocus.

For producing the material modification, a power threshold value is reached or exceeded. Due to the described effect of field strength superelevation, this threshold value will usually be significantly smaller for glass ceramics than the value for the corresponding raw glass (see the table, all values in $W/m^2$):

| | | Material | |
|---|---|---|---|
| | | 8712 | 8724 |
| state | raw glass | 1.0*1E16 | 1.5*1E16 |
| | ceramized | 0.4*1E16 | 0.6*1E16 |

In the case of not optically optimized setups, e.g. when the laser radiation is focused using a lens with spherical aberration, a significantly higher intensity and power occurs in the material at the rear end of the focusing area (in beam direction) than in the vicinity of the imaging optics, so that the threshold values are substantially only exceeded in the vicinity of the intensity peaks. With adapted optics, however, the same pulse energy (equal areas under the curves) is distributed more homogeneously in the focus area, ideally as homogeneously as possible above the glass ceramic threshold, so that as a result of the field strength amplification effect described above the material modification can be produced over a significantly longer region than in glass.

This effect is illustrated below with reference to FIG. 4.

Figure 4:
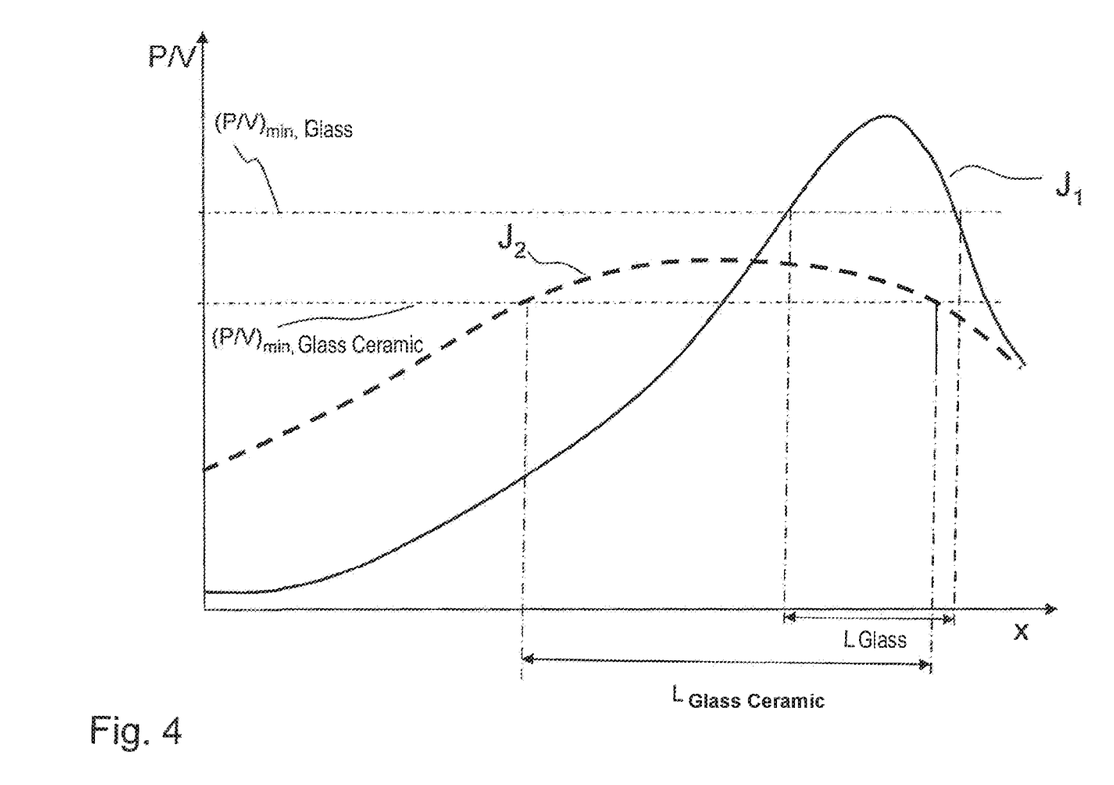
FIG. 4 schematically shows two intensity profiles along the central axis of rays focused in the glass ceramic.

FIG. 4 schematically shows two curves J1, J2 of the power per volume along the central axis of the propagation direction of laser beams focused in the glass ceramic. The values x along the abscissa indicate the distance to the lens. The desired linear modifications are produced above certain power per volume thresholds. In FIG. 4, a threshold value $(P/V)_{min,glass}$ is indicated for producing the modification in glass, and a lower threshold value $(P/V)_{min,glass}$ for producing corresponding modifications in glass ceramics.

Intensity profile J1 results when a lens with spherical aberration is used for focusing, for example.

Intensity profile J2 is an optimized profile as it can be achieved using an axicon, for example. With the focusing, an elongated intensity maximum is achieved. With the same pulse energy, the peak intensity will then be correspondingly lower than in the case of intensity profile J1.

The length of the produced linear modifications now depends on the length of the region in which the pulse power per volume exceeds the respective threshold value. Intensity profile J1 still allows for a linear modification of a length Lglass in glass. However, with intensity profile J2, no modification can be achieved, since the threshold value $(P/V)_{min,glass}$ is no longer exceeded with the comparatively lower maximum intensity. In glass ceramics, on the other hand, this is not only possible with the lower threshold value $(P/V)_{min,glass}$ ceramic, but moreover the achievable length $L_{glass\ ceramic}$ is longer. Because the focal range in which the threshold value is exceeded is elongated in the direction of the beam, a correspondingly elongated linear modification is achieved. Accordingly, the length of the linear modification can be maximized by a preferably homogenous distribution of the laser pulse energy and power per unit volume above the minimum energy and minimum power per unit volume along the focal line.

In order to achieve a longest possible length of the modification, an optical systems may therefore be selected for focusing the laser beam depending on the material of workpiece 2 and at a given pulse energy, which generates an elongated focus with a reduced maximum intensity compared to a spherical lens, and so that the threshold value for producing the material modification will not be undershot. In other words, an optical unit is therefore used for focusing the laser radiation, which spatially extends the focus in the propagation direction, so that the maximum intensity of the laser radiation is less than 150%, preferably less than 130% of the intensity threshold value above which the material is modified.

A suitably intensity distribution is in particular achieved when the beam is focused using the optical unit so that the ratio of the length range along which the intensity is at least 110% of the threshold value of the modification to the length range along which the intensity is at least 10% of the threshold value is at least 0.4, preferably at least 0.5, more preferably at least 0.7. In this way, a particularly suitable distribution of the intensity is achieved so that a very elongated region in the material is irradiated with intensities above the threshold value.

From FIG. 4 it is moreover apparent that the length of the modification can be easily adjusted via the pulse power. With increasing power, the length section is extended along which the threshold value for producing the modification is exceeded.

Figure 5A:
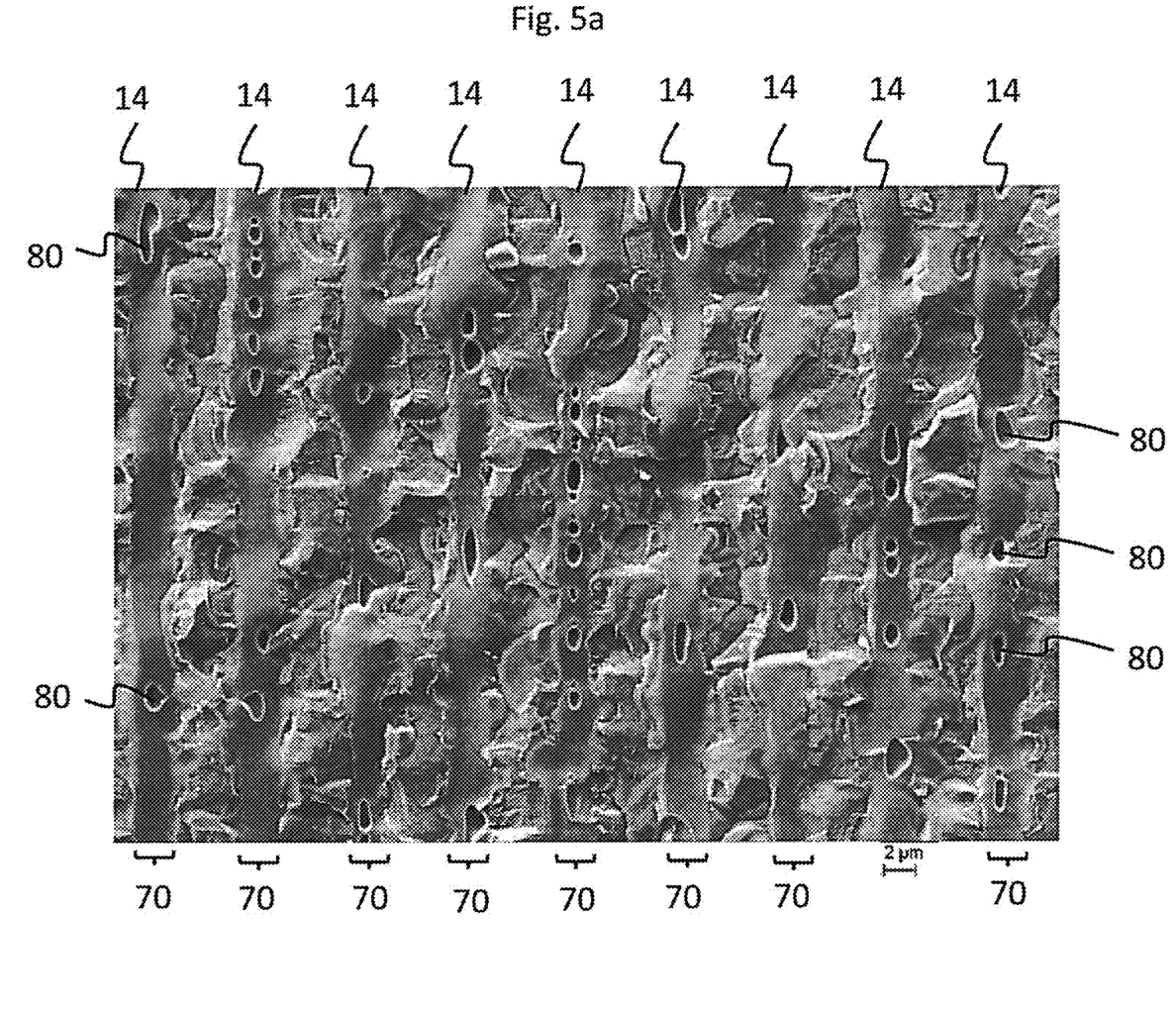
FIGS. 5a and 5b show scanning electron micrographs of linear modifications in a glass ceramic and in a borosilicate glass, respectively.

FIG. 5a shows an SEM image of a plurality of adjacently arranged (from left to right in the figure) linear modifications 14 (and extending from top to bottom in the figure) which are produced by the method according to the invention and in the composite material according to the invention.

The nine visible linear modifications 14 are spaced apart from each other by about 7 micrometers and were produced by laser pulses in the form of bursts and with a biconvex lens (16 mm) using the following process parameters: 6 bursts, burst frequency: 50 MHz, total burst energy: about 500 µJ, decreasing burst shape, pulse energy of the first pulse about 170 µJ, 12 mm tube beam $1/e^2$, wavelength: 1064 nm.

Figure 5B:
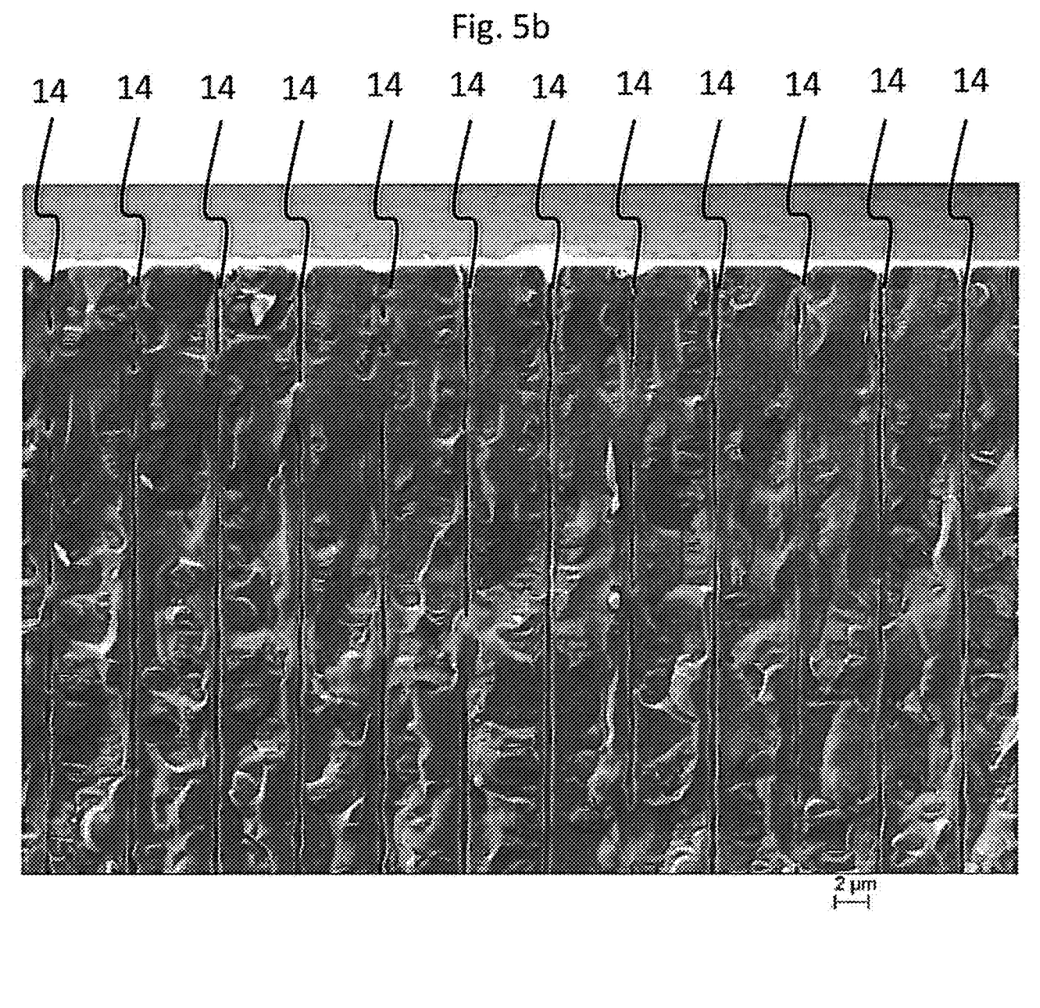

It can be seen in FIG. 5a that the linear modifications are substantially wider than for example in a borosilicate glass which is shown in FIG. 5b, for comparison reasons, and which has filamentary channels with diameters in the submicrometer range.

A linear modification or a defect of a linear modification can accordingly have a width, in particular an average width 70, which is greater than 1 preferably greater than 2 µm. "Width" herein means a dimension perpendicular to the extension of the linear modification.

Such a relatively wide linear modification or defect of a linear modification may in particular exist in the form of a melting zone. Accordingly, material of the composite material may melt around the impact region of the laser and may undergo a phase transformation, for example.

In addition to the relatively wide impact zones, it can also be seen from the SEM image of FIG. 5a that the linear modifications are accompanied by bubble formation in certain regions along their extension direction (along the laser beam axis). The bubbles may in particular be voids, for example at the phase boundaries, due to the field strength superelevation which was already described above. It can also happen that an additional filament channel is formed along the linear modifications.

Accordingly, a linear modification may include at least partially open areas 80, in particular pore-like or bubble-shaped areas.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A composite material, comprising regions of a first phase having a dielectric constant $\varepsilon_{r1}$, regions of at least one second phase having a dielectric constant $\varepsilon r2$, which dielectric constants $\varepsilon r1$ and $\varepsilon r2$ differ from one another;
   wherein the product of the volume, specified in cubic nanometers, of a region of the at least one second phase and the ratio of the dielectric constants of the first phase and the at least one second phase reduced by the value of one is greater than five hundred, wherein the dielectric constant of the first phase $\varepsilon r1$ is greater than or equal to the dielectric constant of the at least one second phase $\varepsilon r2$, and wherein at least one linear modification defined by defects forming a channel of defects of at least 500 micrometers in length extends inside the composite material, wherein the at least one linear modification has an average width in a range from 1 to 5 µm.

2. The composite material as claimed in claim 1, wherein the composite material is a glass ceramic or a polymer material.

3. The composite material as claimed in claim 1, wherein the product of the volume, specified in cubic nanometers, of a region of the at least one second phase and the ratio of the dielectric constants of the first phase and the at least one second phase reduced by the value of one is greater than one thousand.

4. The composite material as claimed in claim 1, wherein the product of the volume, specified in cubic nanometers, of a region of the at least one second phase and the ratio of the dielectric constants of the first phase and the at least one second phase reduced by the value of one is greater than two thousand.

5. The composite material as claimed in claim 1, wherein the regions of the first phase at least partially surround the regions of the at least one second phase.

6. The composite material as claimed in claim 1, wherein the regions of the at least one second phase are embedded by the first phase.

7. The composite material as claimed in claim 1, wherein regions of the at least one second phase are spaced apart from each other.

8. The composite material as claimed in claim 1, wherein the at least one second phase is substantially spherical in shape.

9. The composite material as claimed in claim 1, wherein the length of the at least one linear modification or a total defect length is 500 to 10,000 micrometers.

10. The composite material as claimed in claim 1, wherein the length of the at least one linear modification or the total defect length is 1000 to 10,000 micrometers.

11. The composite material as claimed in claim 1, wherein the length of the at least one linear modification or the total defect length is 3000 to 10,000 micrometers.

12. The composite material as claimed in claim 1, wherein the ratio of the first and second dielectric constants ($\varepsilon r1/\varepsilon r2$) is greater than or equal to 1.1.

13. The composite material as claimed in claim 1, wherein the at least one linear modification formed by defects is defined by a plurality of defects arranged along the channel, wherein the lengths of the defects increase with increasing distance from a surface of the composite material.

14. The composite material as claimed in claim 1, wherein the at least one linear modification has an average width in a range from 2 to 3 µm.

15. The composite material as claimed in claim 1, wherein the at least one linear modification further includes at least partially open areas.

16. The composite material as claimed in claim 15, wherein the at least partially open areas comprise a pore-like or a bubble-shaped area.

17. A composite material, comprising regions of a first phase having a dielectric constant $\varepsilon r1$, regions of at least one second phase having a dielectric constant $\varepsilon r2$, which dielectric constants $\varepsilon r1$ and $\varepsilon r2$ differ from one another;
   wherein the product of the volume, specified in cubic nanometers, of a region of the at least one second phase and the ratio of the dielectric constants of the first phase and the at least one second phase reduced by the value of one is greater than five hundred, wherein the dielectric constant of the first phase $\varepsilon r1$ is greater than or equal to the dielectric constant of the at least one second phase $\varepsilon r2$, and wherein at least one linear modification defined by defects forming a channel of defects of at least 500 micrometers in length extends inside the composite material, wherein the at least one second phase is substantially spherical in shape.

18. A composite material, comprising regions of a first phase having a dielectric constant $\varepsilon r1$, regions of at least one second phase having a dielectric constant $\varepsilon r2$, which dielectric constants $\varepsilon r1$ and $\varepsilon r2$ differ from one another;
   wherein the product of the volume, specified in cubic nanometers, of a region of the at least one second phase and the ratio of the dielectric constants of the first phase and the at least one second phase reduced by the value of one is greater than five hundred, wherein the dielectric constant of the first phase $\varepsilon r1$ is greater than or equal to the dielectricconstant of the at least one second phase $\varepsilon r2$, and wherein at least one linear modification defined by defects forming a channel of defects of at least 500 micrometers in length extends inside the composite material, wherein the at least one linear modification formed by defects is defined by a plurality of defects arranged along the channel, wherein the lengths of the defects increase with increasing distance from a surface of the composite material.

* * * * *

UNITED STATES PATENT AND TRADEMARK OFFICE
CERTIFICATE OF CORRECTION

PATENT NO. : 10,702,948 B2  
APPLICATION NO. : 15/858705  
DATED : July 7, 2020  
INVENTOR(S) : Ortner et al.

Page 1 of 1

It is certified that error appears in the above-identified patent and that said Letters Patent is hereby corrected as shown below:

On the Title Page

Item (56), Under OTHER PUBLICATIONS, in [NPL-1], please delete "<http://www.vpglass.conn/filter_glass/schott_rg610_filter_glass.htnnl>.", and substitute therefore --<http://www.vpglass.com/filter_glass/schott_rg610_filter_glass.html>.--.

In the Specification

Column 6  
At Line 21, please delete "phase Ea is", and substitute therefore --phase $\varepsilon_{rl}$ is--.

Column 16  
At Line 63, please delete "greater than 1", and substitute therefore --greater than 1 µm,--.

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*